Jan. 28, 1969         D. H. BEAUMONT ET AL         3,424,605
              LAMP PHOSPHOR ADHERENCE
                Filed April 14, 1966
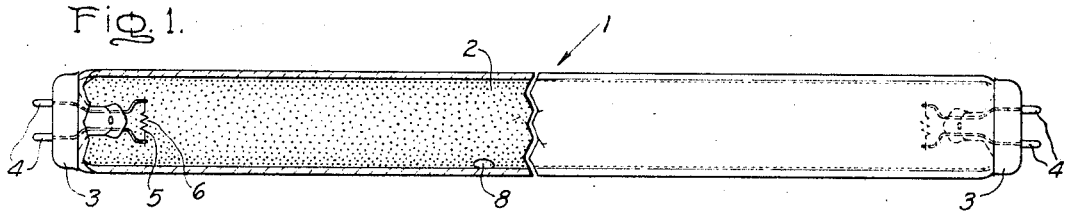
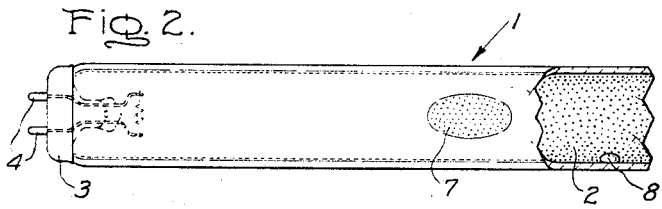
Inventors:
David H. Beaumont
Arnold I. Friedman
by Richard H. Burgess
Their Attorney

United States Patent Office 3,424,605
Patented Jan. 28, 1969

3,424,605
LAMP PHOSPROR ADHERENCE
David H. Beaumont, Lyndhurst, and Arnold I. Friedman, South Euclid, Ohio, assignors to General Electric Company, a corporation of New York
Filed Apr. 14, 1966, Ser. No. 542,582
U.S. Cl. 117—33.5                                  9 Claims
Int. Cl. C09k 1/00; F21k 2/00; B05c 3/06

ABSTRACT OF THE DISCLOSURE

In the making of fluorescent tubes, it has been found that the bonding of the halophosphate phosphors to the glass is improved with the use of barium nitrate as a bonding agent. This suspension is applied to the glass with a temporary binder which is burned off in the lehr.

---

This invention relates to a means for improving the adherence of lamp phosphors in fluorescent lamps. More particularly, it relates to a process, a phosphor suspension, and lamps produced by such process whereby adherence of the phosphor to the lamp is improved and light output and maintenance of light output are not significantly harmed.

Phosphor coatings are normally provided in fluorescent lamps by flushing the lamp with a suspension of phosphor particles, drying the suspension and then lehring the lamp tube. Although fluorescent lamps are not always made in the form of straight tubes, the word "tube" will be used herein to refer generally to the glass shell of the fluorescent lamp on the inside of which a phosphor coating is provided. The suspension may have either an aqueous base or an organic base, and the initial drying step is for the purpose of removing gross amounts of water or organic solvents. This generally leaves a phosphor film adhered to the inside of the glass lamp envelope by means of a temporary organic binder. Lehring removes final amounts of water or organic solvent in addition to burning out the temporary organic binder.

Due to the tendency of the fluorescent coatings to chip or flake off the inside of the envelope in spots during lamp making or use, various means have been proposed in the past for improving the adherence of the phosphor coating to the lamp wall. To be useful in a fluorescent lamp an adherence additive must not react deleteriously with the lamp environment, and should not absorb ultraviolet or visible radiation unproductively, i.e., unless the adherence additive is as efficient a light producer as the phosphor itself, it should be a good reflector of, or transparent to, ultraviolet and visible radiation.

Some success has been achieved in promoting adherence of phosphors which are applied to the lamp envelope as suspensions in organic systems such as solutions of nitrocellulose in butyl acetate and naphtha. However, such additives as finely divided silica, for example, either fail to promote adherence or reduce lamp efficency, brightness or maintenance when used in aqueous suspensions of phosphor with water-soluble temporary organic binders. Also, none of the adherence-promoting additives which have been proposed to date for use in conjunction with aqueous suspension have been completely satisfactory.

Accordingly, it is an object of the present invention to make an adherence additive suitable for use in an aqueous suspension of phosphors for the production of lamps with improved adherence of the phosphor layer, while avoiding the above-mentioned disadvantages encountered by the prior art.

Another object of the invention is to provide a method for producing phosphor coatings in fluorescent lamps from aqueous suspensions of phosphors by which the adherence of the phosphor layer is significantly improved while light output and maintenance of light output are not significantly harmed.

Still another object of the invention is to provide an aqueous suspension for use in such a process.

A further object of the invention is to provide lamps made according to such a process which exhibit characteristics of improved adherence of phosphor layers without significant loss of light output or loss of maintenance of light output.

Further objects and advantages of the invention will appear from the following detailed description of species thereof and from the accompanying drawing.

FIG. 1 of the drawing is a linear tubular fluorescent lamp partly in section and illustrative of the invention.

FIG. 2 is a schematic representation of an end portion of a linear tubular fluorescent lamp including an area characteristic of defects occasionally found in lamps of the prior art after resilient impacting of the lamp wall by an external object.

Briefly stated, according to one aspect of the present invention, means are provided for increasing the adherence of phosphor coatings on inner surfaces of glass lamp walls by a process utilizing an aqueous suspension of a halophosphate phosphor such as calcium halophosphate phosphor activated with antimony and manganese wherein, in addition to the temporary organic binder used to hold the phosphor in place until the lehring process, a permanent adherence additive, namely barium nitrate, $Ba(NO_3)_2$, is used. The $Ba(NO_3)_2$ is added in a form such that it will be in solution in the aqueous phase of the suspension, and should be within the limits of 0.05–0.3 weight percent of the amount of phosphor present on a dry basis. (Percentages herein are by weight except where indicated otherwise.) When the temporary organic adherence additive is carboxymethyl cellulose, the $Ba(NO_3)_2$ is preferably present in amount of 0.07–0.2%, based on the amount of dry phosphor. The carboxymethyl cellulose can be present at about ½% on the same basis, and the pH of the suspension is approximately in the range of 6 to 7. Under such conditions, the optimum $Ba(NO_3)_2$ concentration seems to be about 0.15%. Other temporary organic adherence additives can be used including polymerized ethylene oxide sold by the Union Carbide Corporation under the trademark of "Polyox." The preferable grade of Polyox is WSRN-3000, used in amounts of about 2% based on the weight of the dry phosphor.

Turning now to the drawing, FIG. 1 illustrates one type of fluorescent lamp with which the present invention may be used. This lamp consists of a hermetically sealed linear tubular glass envelope 1 coated on its inside surface with a powdered phosphor 2 which converts the ultraviolet energy of a mercury arc established through the center of the tube into visible light as it is absorbed by the phosphor layer 2 during operation of the lamp. Mercury droplet 8 is vaporized during operation of the lamp. Bases 3 at each end of the lamp support electrical leads 4 which are electrically connected with electrodes 5 at each end of the lamp. The electrodes are coated with electron-emission-promoting materials 6 such as mixtures of oxides containing barium oxide to facilitate operation of the lamp.

FIG. 2 illustrates an end portion of a fluorescent lamp such as the one shown in FIG. 1 after it has been subjected to a test known in the art as a "Snap Test" to determine the adherence of the powder phosphor coating on the inside wall of the lamp. When the glass wall of the lamp is resiliently impacted with a high enough force, low magnitude wave motion will be set up over a short distance in the glass wall causing portions of the phosphor layer to flake off in the vicinity of the impact. The present invention provides a means for greatly improving the resistance to this effect relative to lamps made according to the prior art. The improvement apparently takes the form of increased adherence of phosphor particles to each other and to the glass wall of the lamp tube.

Phosphor coatings are normally produced in fluorescent lamp tubes by either of two general methods. The process wherein the phosphor-containing suspension is flushed downwardly through the tube which is in a vertical position is known as "down-flushing." The process in which the suspension is moved upward through the tube then drained back out the bottom is known as "up-flushing." In up-flushing, the suspension can either be hydrostatically pushed up into the tube or drawn up by vacuum from above. In either of these types of processes, considerable excess suspension is used over and above that which is dried onto each lamp tube, and such excess is recycled. Down-flushing normally involves aerating the suspension to a greater extent than does up-flushing due to the way in which the suspension is sprayed into the empty tube from above. Depending on the design of the particular coating process and the size of the suspension-holding tank, the suspension can be continuously circulated for an extended period of time up to as long as the coater is run continuously.

Due to the economic desirability of making long-time continuous lamp coating runs without shutting down, it is quite desirable that any phosphor suspension be sufficiently stable to be usable in the coating process for a long period of time without deleterious changes taking place in the suspension.

EXAMPLES

Halophosphate phosphors for use in lamps, such as calcium halophosphate phosphor activated with antimony and manganese, may be produced by methods known in the prior art. After the phosphors are produced by firing, they are generally separated into fine particles by milling and are then washed to remove deleterious impurities, can be classified according to size, and are cleaned of essentially all residual material left over from the milling adn washing. Milling can be done in aqueous suspension using a suspending media such as polyvinyl methacrylate-maleic anhydride, and washing can be done with ammoniated ethylenediamine tetracetic acid (EDTA) according to Patent 3,047,512—Martyny, or by use of sulphamic acid, $NH_2SO_3H$, as taught in patent application Ser. No. 441,317, filed Mar. 19, 1965, in the names of Friedman and Beaumont, both of which are assigned to the assignee of the present application.

After classifying according to size, the desired phosphor particles can be rinsed thoroughly with hot water and then dewatered such as by means of a solid basket centrifuge down to a water content of about 20%.

Although various temporary organic binders may be used, carboxymethyl cellulose is one that is particularly suitable when treated in the right manner. Since sodium is considered to be a deleterious impurity in fluorescent lamps, the commercial sodium salt of carboxymethyl cellulose is not used, but instead acid carboxymethyl cellulose is normally obtained as a starting material. Ammonium hydroxide can be added to a water suspension of acid carboxymethyl cellulose at about 60° C. until a clear solution is produced. However, it has been found with the present invention that the strongly basic suspensions produced with ammoniated carboxymethyl cellulose tend to degrade over extended periods of time with exposure to air such as in continuous lamp-making runs. This degradation seems to take place by conversion of $Ba(NO_3)_2$ to $BaCO_3$ on excessive exposure to carbon dioxide. The $BaCO_3$ has a gray appearance and does not lead to the adherence improvements obtained with $Ba(NO_3)_2$ according to the present invention. Therefore, it has been found desirable when using carboxymethyl cellulose as the temporary organic binder to change the suspension from strongly basic to neutral or slightly acid by boiling out excess ammonia at a temperature such as about 95–100° C. for a sufficient time to bring the pH to the desired level of about 6 to 7.

This boiled carboxymethyl cellulose in approximately a 2% solution in water is added to the cleaned phosphor to a level of about ½% carboxymethyl cellulose based on the dry phosphor content after cooling the carboxymethyl cellulose solution. $Ba(NO_3)_2$ is then added preferably in the form of a 5% solution in water to the desired level. The preferred amount of $Ba(NO_3)_2$ is about 0.15% as compared with the total amount of phosphor present on a dry basis. Less than about 0.05–0.07%, depending on circumstances, does not substantially give the desired effects of adherence, and greater than about 0.2–0.3%, again depending on circumstances, results in a decrease in brightness. This might possibly be caused at least partially by trapping of carbon from the residue of the temporary organic binder as the excess $Ba(NO_3)_2$ melts. When carboxymethyl cellulose is used, the preferred $Ba(NO_3)_2$ content is in the range of 0.07–0.2%.

Since it also has been found that excessively acidic, such as about pH 4, suspensions of this type dissolved some of the phosphor producing calcium phosphate which was harmful to lehring and to light production of the resulting lamps, it is desirable to avoid strong acid conditions in the suspension. Slight acidity or a neutral pH such as about from 6 to 7 has been found to avoid both the formation of $BaCO_3$ and attack of the phosphor. However, with this approximately neutral suspension another problem has been encountered.

In some cases bacterial growth has decreased the viscosity of the neutral suspension to such an extent that it is not usable after a continuous coating run of several hours or a few days. This seems to be caused by common although unidentified airborne or soil inhabiting bacteria which digest the cellulosics present in the carboxymethyl cellulose of the suspension. After some time, strong odors are also present. Series of tests involving the growth of nutrient broth culture media enriched with ½% carboxymethyl cellulose suspension contaminated with the bacteria in an incubator at 35° C. for 24 hours have shown that certain common bactericides are effective in preventing this bacteria growth. Thymol,

in amounts of 250 and 500 parts per million by weight of the suspension as diluted for coating was found to be effective in preventing this growth. Larger amounts are not readily soluble in the aqueous suspension. Preferably, the thymol is added to the suspension as a solution in alcohol. First, a solution can be made of 50 grams of thymol per liter of methanol. This can then be added very slowly and with continuous stirring to the neutral carboxymethyl cellulose solution, preferably while still warm (50–60° C.) after boiling off the excess ammonia. Since the bacterial growth seems to take place only in approximately neutral suspensions containing cellulosics, thymol is not needed with other types of suspensions.

When desirable, a nonionic surfactant wetting agent such as "Igepal" (trademark of General Aniline and Film Corporation) can be added to the suspension in amounts of preferably about 29 parts per million or less based on the phosphor to enhance the wetting of the inside glass surfaces of the lamp tube by the aqueous suspension. This is more important when the surfaces may have some oily substances present on them. Due to apparent immiscibility of thymol and Igepal, when thymol is used and a wetting agent is also desired, it is preferable to use an anionic surfactant such as "Alipal" CO436 or RC335 produced by General Aniline and Film Corporation.

After the preparation as described above, the suspension is preferably thoroughly homogenized by means of a high-speed mixer and then filtered in order to tear up any undissolved gels of carboxymethyl cellulose which might otherwise leave spots on the bulb wall, and generally to assure homogeneity and the absence of lumps. For use in producing lamps the suspension can then be diluted by adding water such as in amounts equal to the total volume. Other temporary organic binders than carboxymethyl cellulose can be used, including naturally occurring alginates and polymerized ethylene oxide.

Polymerized ethylene oxide marketed by Union Carbide Corporation under the trademark "Polyox" has been found to be useful in conjunction with the present invention as a temporary organic binder. The preferable grade presently being sold is WSRN–3000. These materials have not previously been useful as temporary organic binders in the production of phosphor coatings in fluorescent lamps because of their deleterious effects on permanent adherence of the phosphor in the lamp tube. However, when combined with $Ba(NO_3)_2$ according to the present invention, Polyox has been found to be satisfactory and desirable. Apparently the $Ba(NO_3)_2$ so much improves the permanent adherence of the phosphor layer that other inherent advantages of the Polyox as a temporary organic binder can be utilized.

Polyox can be utilized as an 8% solution stirred into cold water and then added to the phosphor to an amount of 2% based on the weight of the dry phosphor. The use of bactericides as was necessary with carboxymethyl cellulose is not required because the Polyox is not a cellulosic and therefore not attacked by these types of bacteria.

It seems desirable for the $Ba(NO_3)_2$ to melt during lehring to obtain improved adherence of the phosphor particles to each other and to the inside surface of the glass lamp tube. Near the melting point of $Ba(NO_3)_2$, about 592° C. in air, the viscosity of the liquid $Ba(NO_3)_2$ becomes low enough to permit rapid wetting of the surfaces of the phosphor particles and the glass lamp tube. Since the $Ba(NO_3)_2$ is initially dispersed on these surfaces from a water solution which is evaporated, the liquid $Ba(NO_3)_2$ is able to wet the entire surfaces quite uniformly and effectively.

Carboxymethyl cellulose is preferably lehred out at about 635° C. for up to 90 seconds, but Polyox temporary organic binder can be lehred out at lower temperatures such as about 600° C. Lehring can be accomplished, as is known in the art, in an air atmosphere by electric resistance heating, or by combustion heating which will modify the atmosphere. In any event, burning out of the temporary organic binder will affect the atmosphere in the lamp tube. The temporary organic binder is essentially all removed by oxidation before the $Ba(NO_3)_2$ melts, preferably leaving no deleterious residue.

$Ba(NO_3)_2$ has been found to decompose initially to $Ba(NO_2)_2$, $BaO$ and $BaO_2$ at temperatures, ranging from 670° C. to 810° C., depending on the atmosphere. Other compounds that decompose at lower temperatures, or that do not melt at temperatures above the combustion range of the temporary organic binders and so near effective lehring temperatures, are not as satisfactory in promoting adherence as is $Ba(NO_3)_2$.

There seems to be a beneficial effect involved in the surface chemistry of the phosphors interacting with the $Ba(NO_3)_2$ rsulting in improved adherence and, at the same time, no significant loss in light output or efficiency. Perhaps the form and situation of whatever reaction products might be present operate to remove deleterious phases from the atmosphere of the lamp during lamp operation, such as by tying up any residual water vapor. However, no firm theories have been put forth as to how the effect takes place.

To illustrate the degree of improvement obtained by the use of the present invention, Tables I and II below set forth results of comparative snap testing to show adherence improvement along with comparisons of brightness and efficiency at various time intervals between control lamps and lamps produced according to the invention. Snap testing, described above in conjunction with FIG. 2, involves resiliently impacting the lamp and then measuring the diameter of the area of the phosphor which has been knocked off, referred to as "Coating Off." These tests used a length of piano wire for impacting the lamp about six inches from one end. Light output and efficiency, measured in lumens and lumens per watt (LPW) after 100 hours of lamp operation, are given.

Table I compares control lamps made using carboxymethyl cellulose temporary organic binder with lamps utilizing the invention with 0.15% $Ba(NO_3)_2$ in three pairs. The differences between the pairs resulting in progressively better adherence are from different amounts of milling. The first pair used relatively fine phosphors, while the third pair used relatively coarse phosphors.

TABLE I.—CARBOXYMETHYL CELLULOSE BINDER

| Test | Coating off (mm.) | Lumens | LPW |
| --- | --- | --- | --- |
| Control | 120 | 3,268 | 79.1 |
| $Ba(NO_3)$ added | 45 | 3,269 | 78.6 |
| Control | 85 | 3,281 | 79.6 |
| $Ba(NO_3)_2$ added | 35 | 3,278 | 79.2 |
| Control | 30 | 3,194 | 75.9 |
| $Ba(NO_3)_2$ added | 18 | 3,224 | 76.2 |

Table II compares control lamps made using polyox temporary organic binder with lamps made according to the invention with 0.2% $Ba(NO_3)_2$. The two pairs were identical except for lehring conditions.

TABLE II.—POLYOX BINDER

| Test | Coating off (mm.) | Lumens | LPW |
| --- | --- | --- | --- |
| Control | 70 | 3,240 | 76.3 |
| $Ba(NO_3)_2$ added | 2 | 3,256 | 76.7 |
| Control | 50 | 3,231 | 76.8 |
| $Ba(NO_3)_2$ added | 15 | 3,250 | 77.4 |

In each instance, it is apparent that significant improvements have been made in adherence by the invention without incurring great losses in light output or efficiency.

What we claim as new and desire to secure by Letters Patent of the United States is:

1. A method of coating a fluorescent lamp tube with phosphor having improved adherence to said tube, said method comprising coating said tube with an aqueous suspension of halophosphate phosphor particles containing, by weight based on the amount of dry phosphor, about 0.05–0.3% $Ba(NO_3)_2$ in solution and a small but effective amount of a temporary organic binder which can be essentially completely removed from the lamp tube on lehring, drying the coated tube to remove gross amounts of water, and then lehring the tube at temperatures rising to above the melting point of said $Ba(NO_3)_2$ to burn out the temporary organic binder and any remaining deleterious water and to effectuate an improved bonding of said phosphor particles to said tube.

2. The process of claim 1 wherein the quantity of $Ba(NO_3)_2$ is about 0.07–0.2%, the temporary organic binder is carboxymethyl cellulose, and the solution has a pH approximately in the range of 6 to 7.

3. The process of claim 1 wherein the temporary organic binder is polymerized ethylene oxide.

4. An aqueous suspension of halophosphate phosphor containing, by weight of the dry phosphor content, about 0.05–0.3% $Ba(NO_3)_2$ in solution and a small but effective amount of a temporary organic binder which can be essentially completely removed by lehring from a lamp tube in which the suspension has been coated.

5. An aqueous suspension according to claim 4 in which said temporary organic binder is carboxymethyl cellulose and the pH of the suspension is approximately in the range of 6 to 7.

6. A suspension according to claim 4 in which the temporary organic binder is polymerized ethylene oxide.

7. A fluorescent lamp containing a coating of halophosphate phosphor of improved adherence which has been applied to the inner wall of the tube of said lamp by a method comprising coating said tube with an aqueous suspension of halophosphate phosphor particles containing, by weight based on the amount of dry phosphor, about 0.05–0.3% $Ba(NO_3)_2$ in solution and a small but effective amount of a temporary organic binder which can be essentially completely removed from the lamp tube on lehring, drying the coated tube to remove gross amounts of water, and then lehring the tube at temperatures rising to above the melting point of said $Ba(NO_3)_2$ to burn out the temporary organic binder and any remaining deleterious water and to effectuate an improved bonding of said phosphor particles to said tube.

8. A fluorescent lamp according to claim 7 wherein the quantity of $Ba(NO_3)_2$ is about 0.07–0.2%, the temporary organic binder is carboxymethyl cellulose, and the solution has a pH approxmiately in the range of 6 to 7.

9. A fluorescent lamp according to claim 7 wherein the temporary organic binder is polymerized ethylene oxide.

References Cited

UNITED STATES PATENTS

| | | | |
|---|---|---|---|
| 2,662,830 | 12/1953 | Darlaston | 117—33.5 |
| 2,684,306 | 7/1954 | Brewer et al. | 117—33.5 |
| 2,793,137 | 5/1957 | Friedman | 117—33.5 |
| 2,905,571 | 9/1959 | Seats et al. | 117—33.5 |
| 2,951,767 | 9/1960 | Beese | 117—33.5 |
| 3,059,133 | 10/1962 | Wanmaker et al. | 117—33.5 XR |
| 3,310,418 | 3/1967 | Friedman et al. | 117—33.5 |

ALFRED L. LEAVITT, *Primary Examiner.*

W. F. CYRON, *Assistant Examiner.*

U.S. Cl. X.R.

117—97; 252—301.3